UNITED STATES PATENT OFFICE.

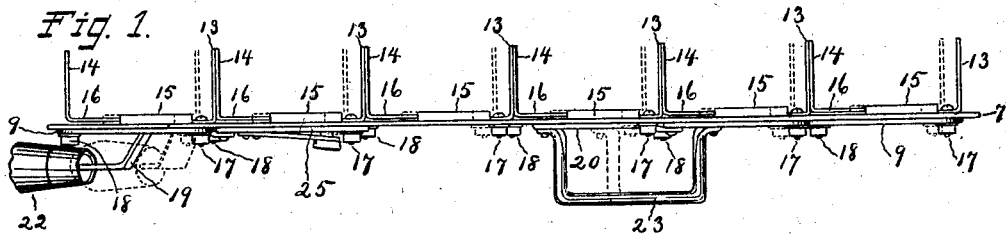
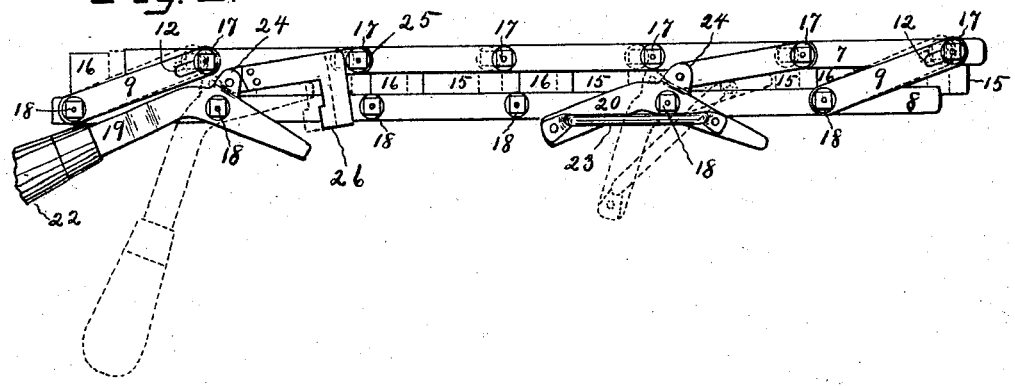
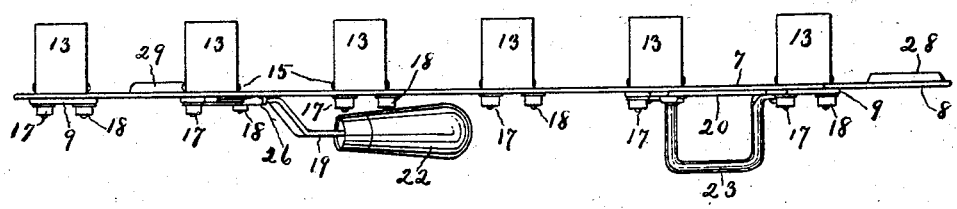
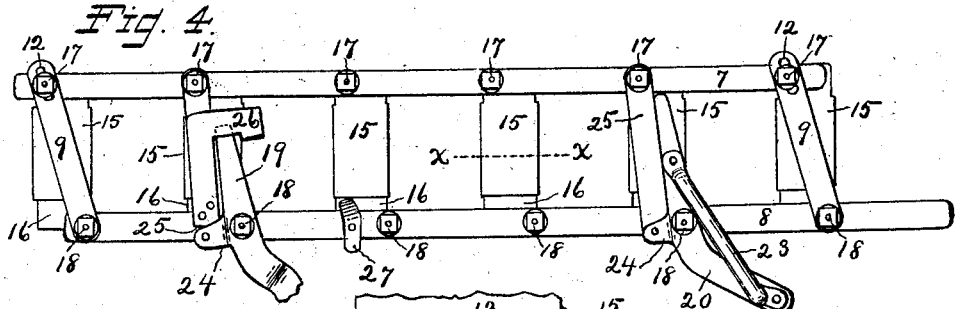
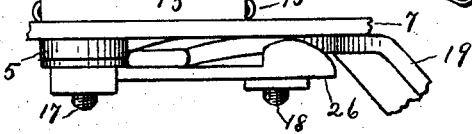
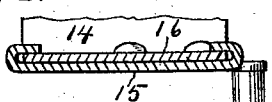

WILLIAM TOWERS, OF NEW BRITAIN, CONNECTICUT.

BRICK-EDGER.

SPECIFICATION forming part of Letters Patent No. 694,120, dated February 25, 1902.

Application filed November 19, 1901. Serial No. 82,872. (No model.)

*To all whom it may concern:*

Be it known that I, WILLIAM TOWERS, a citizen of the United States, residing at New Britain, in the county of Hartford and State of Connecticut, have invented certain new and useful Improvements in Brick-Edgers, of which the following is a specification.

My invention relates to improvements in brick-edgers or implements for turning bricks up edgewise on the pallets upon which the newly-molded bricks are placed for drying; and the main object of my improvement is to produce a machine or implement for seizing the bricks as they lie flatly upon the said pallet and without marring them, turning the bricks so that they rest upon their edges very much in the same fashion as they are ordinarily thus turned by hand.

In the accompanying drawings, Figure 1 is a plan view of my implement when in a position ready to be applied to a series of six bricks as they lie upon the pallet, together with broken lines indicating the position of the parts in their grasping position just ready to turn the bricks. Fig. 2 is a front elevation of the same with the same second position indicated by broken lines. Fig. 3 is a plan view of the same with the parts in the position they have when the bricks have been turned upon their edges. Fig. 4 is a front view of the same. Fig. 5 is an enlarged plan view of a portion of the said implement, and Fig. 6 is an enlarged sectional plan view of a portion of the same on the line *x x* of Fig. 4.

Two longitudinal bars or plates 7 8 and two cross-bars or links 9 9, pivoted thereto, constitute the frame of my implement. As shown, these cross-bars 9 are pivoted by the finger-pins or pivots 18, hereinafter described, to the lower longitudinal bar 8 and by the finger-pins 17 to the upper bar 7, one of the said pivotal joints being a "pin-and-slot" connection by having the upper ends of the cross-bars 9 provided with a slot 12 for the pins 17. Upon the said frame I pivot any desired number of pairs of grasping fingers or blades 13 14, preferably six pairs. Each pair of fingers is connected by an extensible and contractile back or connection made in two parts 15 and 16, one lapping over the other and arranged to slide longitudinally, so as to bring the fingers in each pair to and from each other when desired. The fingers 13, as shown, are made integral with the part back 15, while the fingers 14 are shown integral with the part back 16. The edges of the part 15 are rolled around the edges of the part 16, as best shown in Fig. 6, to form proper ways or guides for the said parts to slide on. The parts 13 15 are hinged or pivoted at one corner to the upper bar 7 by finger-pins 17, made rigid therewith, and the parts 14 16 at the diagonally opposite corner of each pair of fingers and back or connection by the finger-pins 18.

For operating the frame and its fingers I employ an operating-lever 19 and a holding-lever 20, both pivoted to the lower bar 8 by the finger-pins 18. These levers are provided with handles 22 and 23, the handle 22 of the operating-lever being preferably arranged longitudinally at the outer end of the said lever, as shown. Each lever is provided with a short angle-arm 24, to which one end of the links 25 are pivoted, while the opposite ends of the said links are pivoted to the upper bar 7 of the frame by means of the same finger-pins that pivot the adjacent pair of fingers to the said bar. In connection with the operating-lever I provide a spring-catch 26, rigidly secured to the front of the link 25 and having a shouldered and beveled outer end. The shoulder of this spring-catch is for engagement with the short end of the operating-lever, while its beveled end or nose is for being engaged by the trip-cam 27 on the lower bar 8 of the frame to release the said lever from the said catch for a part of its stroke. When the operating handle and lever are forced to their extreme limit toward the left, as shown in Figs. 1 and 2, the bars 7 and 8 of the frame nearly come together, and the several pairs of finger-blades lie vertically, with the back or outer face of the fingers in each pair resting closely against the back or outer face of a finger of the adjacent pair, so that the said vertical finger-blades in each pair are separated or opened to their full extent, as shown in Fig. 1. The parts are arrested in this position by means of the lower edge of the part 15 of the extensible connection of the right-hand pair of fingers coming in contact with the stop 28, Fig. 3, on the lower bar 8 of the frame. The operator holds the handle 23 in his right hand and the handle 22 in his left hand, and then placing the lower edges of the finger-blades on the pallet inserts the abutting fingers into the usual spaces between the six bricks lying on the pallet, while the single fingers at each end extend along on the outer side of the two end bricks on the pallet. With the right hand he merely supports the implement or machine, the work being mainly performed by the left hand. The operating-handle is then moved toward the right, when the angle-arm 24 through the link 25 pulls the upper bar to the left, thereby drawing the fingers of each pair toward each other, the said movement being provided for by the extensible and contractile extension between the fingers of each pair. This position is indicated by broken lines in Figs. 1 and 2, and by thus drawing the fingers together the said fingers grasp the bricks by their edges. In moving the lever 19 into this position its upper or short arm passes under the beveled nose of the spring-catch 26 and its edge engages the edge of the link 25, ready to drive it, as shown by the broken lines in Fig. 2. The frame which carries the fingers is thus compelled by a continued movement of the operating-lever to swing on its cross-bars from the position shown in Figs. 1 and 2 to that shown in Figs. 3 and 4, the fingers, with the bricks clasped therein, also swinging on their pivots or finger-pins with the frame and turning the bricks from their broadside position on the pallet one-quarter of a revolution, so that the broad sides of the brick are now vertical instead of horizontal. The parts are stopped in this position by having one of the lower blades strike the stop 29, Fig. 3, on the lower bar near the left-hand end. The implement is then pulled toward the operator, leaving the bricks lying edge up on the pallet. The operating-lever is then moved to the left, when its short end will strike the shoulder of the spring-catch for driving the frame, with the said lever, back into its former position. As the frame swings over, the beveled nose of the spring-catch 26 engages the cam 27 on the lower bar just outside of the extreme end of the lever 19 and springs the said catch forwardly far enough to disengage the short arm of the lever 19 from the shoulder of the said catch, so that it may be moved for again opening the fingers, as shown in Figs. 1 and 2, ready to repeat the operation. Although I have described the several operations as different movements following each other, the implement is operated for closing the fingers and turning the brick by practically one continuous movement of the operating-lever.

It is apparent that some changes from the specific construction herein disclosed may be made, and therefore I do not wish to be understood as limiting myself to the precise form of construction shown and described, but desire the liberty to make such changes in working my invention as may fairly come within the spirit and scope of the same.

I am aware that the patent to Farrington, No. 22,790, of February 1, 1859, shows and describes a "brick-mold" consisting of a frame provided with an operating-handle and a series of blades hinged to the said frame for pressing against one edge only of the bricks without grasping them for use in pressing against the edges of the bricks as they lie flatly upon the pallet and poking or rolling them over to stand up edgewise; also that a prior patent shows and describes a "pallet brick-re-presser" consisting of a frame and a series of hinged blades arranged in pairs, with mechanism for operating the said blades to re-press or dress up the edges of the bricks when soft, but without any mechanism for turning the bricks. All of the said prior art is hereby disclaimed.

I claim as my invention—

1. An implement for edging bricks comprising a frame, a series of fingers arranged on the said frame in pairs to open and close upon the opposite edges of the bricks and to turn in pairs upon the said frame, and means for operating the said pairs of fingers to close them and to turn them in pairs, substantially as described.

2. The combination of the swinging frame with pairs of grasping-fingers having extensible and contractile connections, the said fingers being pivotally mounted upon the said frame, and means for operating the said fingers for drawing them toward each other and turning each pair, substantially as described.

3. The combination of the swinging frame with pairs of grasping-fingers, pivotally mounted on the said frame and arranged to open and close for grasping the bricks, the operating-lever having angle-arm 24, the link 25 pivoted to the said angle-arm and to one of the bars of the said frame, the spring-catch and the trip-cam, whereby the operating-lever acts first to close the fingers and second to turn them on the frame, substantially as described.

4. The combination of the swinging frame with the grasping-fingers, pivotally mounted upon the said frame, the operating and holding levers each having the upwardly-extending short arm and the angle-arm 24, the links 25 pivoted by one end to the said angle-arms and by their opposite end to the upper bar of the said frame, substantially as described.

WILLIAM TOWERS.

Witnesses:
JAMES SHEPARD,
SHEFFIELD CLARKE.